United States Patent
Chen et al.

(10) Patent No.: US 10,503,885 B2
(45) Date of Patent: Dec. 10, 2019

(54) ELECTRONIC DEVICE AND UNLOCKING METHOD THEREFOR

(71) Applicant: HON HAI PRECISION INDUSTRY CO., LTD., New Taipei (TW)

(72) Inventors: Yen-Yu Chen, New Taipei (TW); Hao-Yuan Huang, New Taipei (TW); Chun-Kai Peng, New Taipei (TW); Chia-Jui Hu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 217 days.

(21) Appl. No.: 15/603,431

(22) Filed: May 23, 2017

(65) Prior Publication Data

US 2017/0344735 A1    Nov. 30, 2017

(30) Foreign Application Priority Data

May 24, 2016  (CN) .......................... 2016 1 0349368

(51) Int. Cl.
  *G06F 21/00* (2013.01)
  *G06F 21/32* (2013.01)
  *G06K 9/00* (2006.01)

(52) U.S. Cl.
  CPC ......... *G06F 21/32* (2013.01); *G06K 9/00255* (2013.01); *G06K 9/00288* (2013.01); *G06K 9/00604* (2013.01); *G06K 9/00617* (2013.01)

(58) Field of Classification Search
  CPC ..... G06F 21/31; G06F 21/32; G06K 9/00255; G06K 9/00288; G06K 9/00604; G06K 9/00617; G06K 9/00624
  USPC ................. 726/16–19, 27–30; 713/182, 186; 382/115–116, 118
  See application file for complete search history.

(56) References Cited

U.S. PATENT DOCUMENTS

| | | | |
|---|---|---|---|
| 8,811,948 B2 * | 8/2014 | Bandyopadhyay ... | G06F 1/1643 455/411 |
| 8,854,180 B2 * | 10/2014 | Bacarella .............. | E05B 47/026 340/5.6 |
| 8,914,875 B2 * | 12/2014 | Matus ..................... | G06F 21/32 726/17 |
| 9,235,729 B2 * | 1/2016 | Robison .............. | G06F 21/6263 |
| 9,292,045 B2 * | 3/2016 | Shultz ............... | H04M 1/72522 |
| 9,432,361 B2 * | 8/2016 | Mahaffey ............ | H04L 63/0853 |

* cited by examiner

*Primary Examiner* — Hosuk Song
(74) *Attorney, Agent, or Firm* — ScienBiziP, P.C.

(57) ABSTRACT

An unlocking method used in an electronic device includes acquires data as to motion of the electronic device detected by a gyroscope at predetermined intervals when the electronic device is locked. If current motion of the electronic device is caused by a human, according to the acquired motion data and motion data stored in the storage device, a capturing device is controlled to capture an image. Biological characteristics in the acquired image are matched against biological characteristics pre-stored in the storage device, and the electronic device is unlocked when matching biological characteristic is found.

8 Claims, 2 Drawing Sheets

ELECTRONIC DEVICE AND UNLOCKING METHOD THEREFOR

CROSS-REFERENCE TO RELATED APPLICATIONS

This application claims priority to Chinese Patent Application No. 201610349368.8 filed on May 24, 2016, the contents of which are incorporated by reference herein.

FIELD

The subject matter herein generally relates to electronic security, and particularly to an electronic device and an unlocking method for the device.

BACKGROUND

A smart phone can be unlocked by way of waking up a display screen when a physical key is pressed, and a password can be input by a user. However, if frequently pressed, physical keys may be easily damaged.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
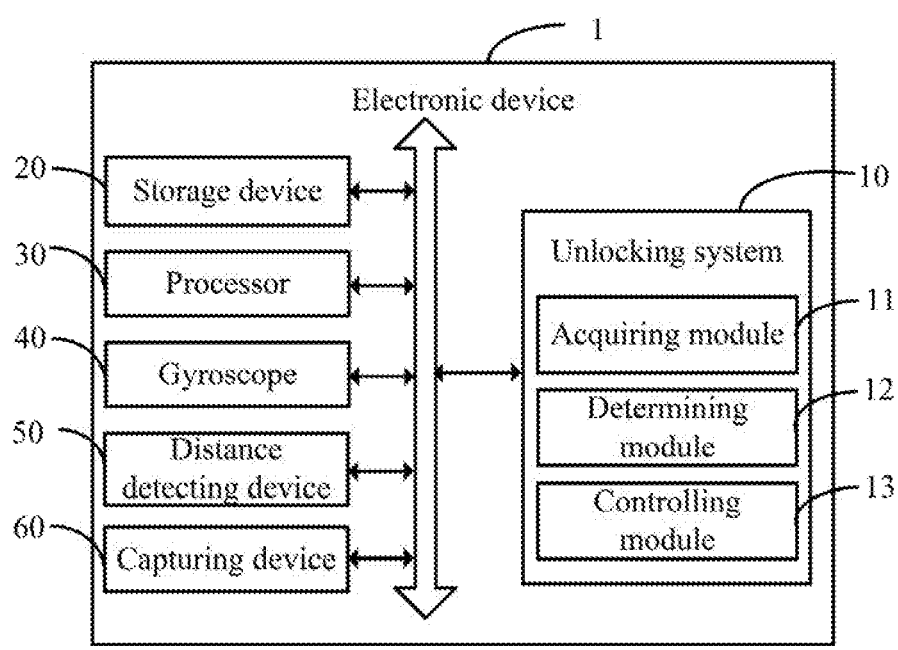
FIG. 1 is a block diagram of an exemplary embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates an exemplary embodiment of an electronic device 1. An unlocking system 10 is run on the electronic device 1. The electronic device 1 includes, but is not limited to, a processor 20, a storage device 30, a gyroscope 40, a distance detecting device 50, and a capturing device 60. In at least one exemplary embodiment, the electronic device 1 can be a smart phone, a personal computer, or a personal digital assistant. FIG. 1 illustrates only one example of the electronic device 1, other examples can include more or fewer components than as illustrated, or have a different configuration of the various components in other exemplary embodiments.

In at least one exemplary embodiment, the processor 20 can be a central processing unit (CPU), a microprocessor, or other data processor chip that performs functions of the electronic device 1.

In at least one exemplary embodiment, the storage device 30 can include various types of non-transitory computer-readable storage mediums. For example, the storage device 30 can be an internal storage system, such as a flash memory, a random access memory (RAM) for temporary storage of information, and/or a read-only memory (ROM) for permanent storage of information. The storage device 30 can also be an external storage system, such as a hard disk, a storage card, or a data storage medium.

The storage device 30 is used for storing motion data of the electronic device 1 when the motion is caused by a human. Further, biological characteristics of a user of the electronic device 1 which can be detected are also stored in device 30. In at least one exemplary embodiment, the biological characteristics can be facial image information or iris information.

In at least one exemplary embodiment, the gyroscope 40 can be a Z-axis gyroscope or a three-axis gyroscope. The gyroscope 40 is used for detecting the motion of the electronic device 1.

In at least one exemplary embodiment, the distance detecting device 50 can be an infrared sensor or an ultrasonic wave sensor. The distance detecting device 50 is used for detecting whether there is an object in front of the electronic device 1 within a predetermined range.

In at least one exemplary embodiment, the capturing device 60 can be a camera. The capturing device 60 is used for capturing images in front of the electronic device 1.

As illustrated in FIG. 1, the unlocking system 10 includes an acquiring module 11, a determining module 12, and a controlling module 13. The modules 11-13 can be collections of software instructions stored in the storage device 30 of the electronic device 1 and executed by the processor 20. The modules 11-13 also can include functionality represented as hardware or integrated circuits, or as software and hardware combinations, such as a special-purpose processor or a general-purpose processor with special-purpose firmware.

When the electronic device 1 is locked, the acquiring module 11 is used to acquire the motion data of the electronic device 1 as detected by the gyroscope 40 at predetermined intervals.

In at least one exemplary embodiment, the motion data can include, but is not limited to, velocity, angular velocity, and acceleration of the device 1. The predetermined interval can be five seconds. In other exemplary embodiments, the predetermined interval can be any other value.

The determining module 12 is used to determine whether current motion of the electronic device 1 is caused by a human, according to the acquired motion data and the motion data previously stored in the storage device 30.

In at least one exemplary embodiment, the determining module 12 compares the acquired motion data of the electronic device 1 to the stored motion data. When differences between the acquired motion data of the electronic device 1 and the stored motion data are within a predetermined range, the determining module 12 determines that the current motion of the electronic device 1 is caused by the human. In at least one exemplary embodiment, the human-made motion may be for example shaking the electronic device 1.

When the determining module 12 determines that the current motion of the electronic device 1 is caused by the human, the controlling module 13 is used to control the distance detecting device 50 to detect whether there is an object in front of the electronic device 1 within the predetermined range. In at least one exemplary embodiment, the predetermined distance can be one meter. In other exemplary embodiments, the predetermined distance can be any other value.

In at least one exemplary embodiment, the distance detecting device 50 transmits infrared rays in the predetermined distance range. When the distance detecting device 50 receives reflected infrared rays, indicating an object within the predetermined distance range, the distance detecting device 50 further acquires an infrared image of the object, recognizes whether the infrared image of the object is an image with a human contour, and determines the object is a human when the infrared image of the object is the image with the human contour.

When the distance detecting device 50 determines that there is a human within the predetermined distance in front of the electronic device 1, the controlling module 13 is further used to control the capturing device 60 to capture an image of such human.

In other exemplary embodiments, the unlocking system 10 does not detect a human in front of the electronic device 1, but can directly control the capturing device 60 to capture an image of the scene in front of the electronic device 1. That is, when the determining module 12 determines that the current motion of the electronic device 1 is caused by the human, the controlling module 13 controls the capturing device 60 to capture an image of the scene in front of the electronic device 1, without controlling the distance detecting device 50 to first detect any object in front of the electronic device 1.

The acquiring module 11 further acquires the image captured by the capturing device 60, and the determining module 12 further determines whether any biological characteristics detectable in the acquired image match with at least one of the biological characteristic pre-stored in the storage device 30.

In at least one exemplary embodiment, the determining module 12 determines whether facial image information is detectable in the acquired image. If the determining module 12 determines that biological characteristics can be detected in the acquired image, the determining module 12 further determines whether the biological characteristics in the acquired image match with at least one biological characteristic pre-stored in the storage device 30, by way of facial image recognition. In other exemplary embodiments, the biological characteristics can include iris characteristics.

If the determining module 12 determines that the biological characteristics in the acquired image match with at least one biological characteristic pre-stored in the storage device 30, the controlling module 13 is further used to control the electronic device 1 to unlock.

Figure 2:
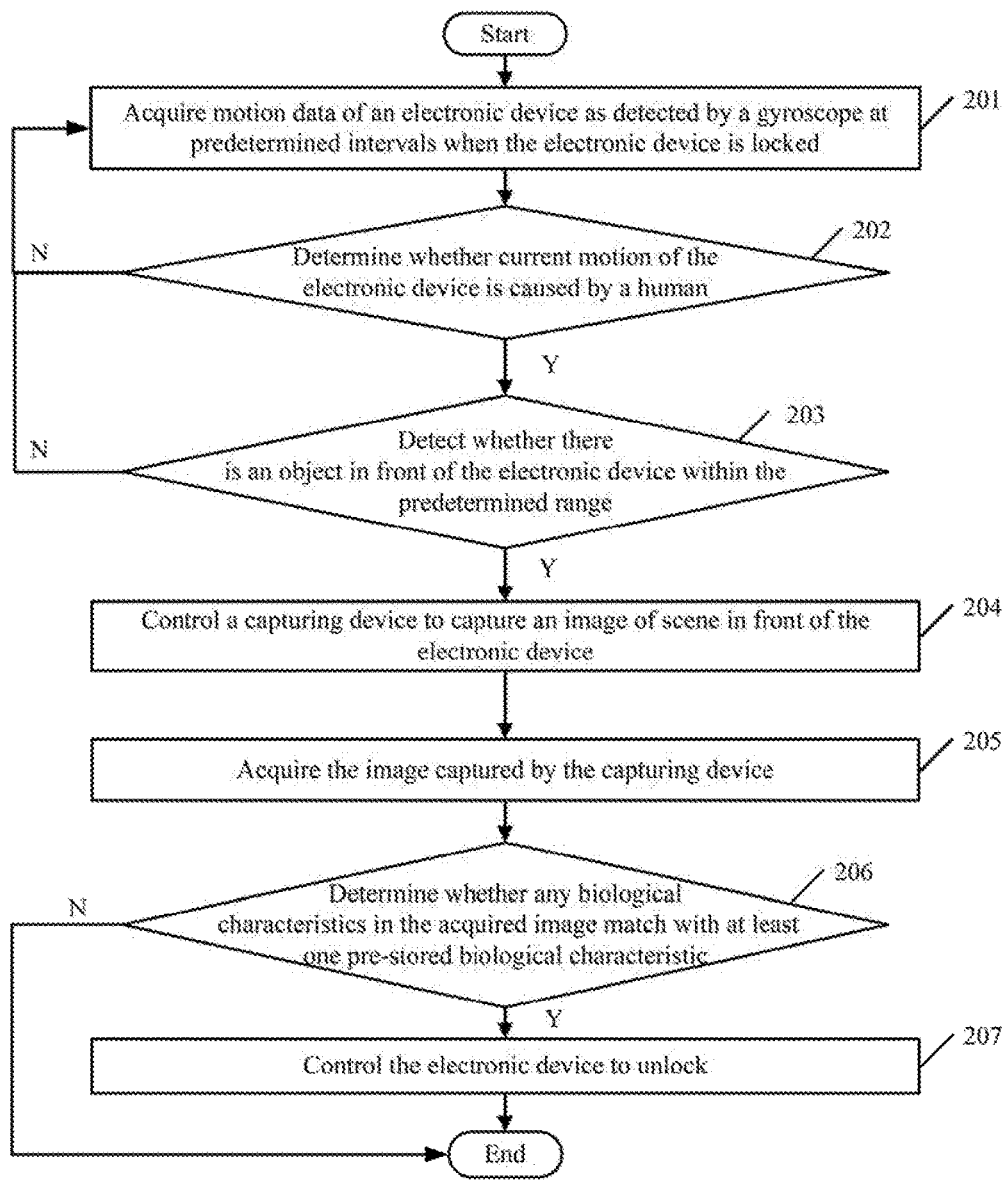
FIG. 2 illustrates a flowchart of an exemplary embodiment of an unlocking method used in the electronic device in FIG. 1.

FIG. 2 illustrates a flowchart of an exemplary embodiment of unlocking method. The method is provided by way of example, as there are a variety of ways to carry out the method. The method described below can be carried out using the configurations illustrated in FIG. 1, for example, and various elements of these figures are referenced in explaining the example method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 201.

At block 201, when the electronic device is locked, an acquiring module acquires motion data of an electronic device as detected by a gyroscope at predetermined intervals.

At block 202, a determining module determines whether current motion of the electronic device is caused by a human, according to the acquired motion data and the motion data previously stored in a storage device. If the current motion of the electronic device is caused by the human, the process jumps to block 203. If the current motion of the electronic device is not caused by the human, the process returns to block 201. In other exemplary embodiments, block 203 can be removed, that is, if the current motion of the electronic device is caused by the human, the process jumps to block 204.

At block 203, a controlling module controls a distance detecting device to detect whether there is an object in front of the electronic device within a predetermined range. If there is the object in front of the electronic device within the predetermined range, the process jumps to block 204. If there is no object in front of the electronic device within the predetermined range, the process returns to block 201.

At block 204, the controlling module further controls a capturing device to capture an image of scene in front of the electronic device.

At block 205, the acquiring module further acquires the image captured by the capturing device.

At block 206, the determining module further determines whether any biological characteristics detectable in the acquired image match with at least one the biological characteristic pre-stored in the storage device. If the biological characteristics in the acquired image match with at least one biological characteristic pre-stored in the storage device, the process jumps to block 207. If the biological characteristics in the acquired image does not match with any one of the biological characteristics pre-stored in the storage device, the process ends.

At block 207, the controlling module further controls the electronic device to unlock.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An electronic device comprising:
   at least one processor;
   a gyroscope electrically coupled to the processor;
   a capturing device electrically coupled to the processor; and
   a storage device electrically coupled to the processor and storing instructions for execution by the processor to cause the processor to:
      acquire, when the electronic device is locked, motion data of the electronic device as detected by the gyroscope at predetermined intervals;
      determine whether current motion of the electronic device is caused by a human, according to the acquired motion data and motion data pre-stored in the storage device;
      control, when determining that the current motion of the electronic device is caused by the human, a capturing device to capture an image of scene in front of the electronic device;
      acquire the image captured by the capturing device;
      determine whether any biological characteristics in the acquired image match with at least one biological characteristic pre-stored in the storage device; and
      control, when determining that the biological characteristics in the acquired image match with at least one biological characteristic pre-stored in the storage device, the electronic device to unlock.

2. The electronic device according to claim 1, further comprising:
   a distance detecting device electronically coupled to the at least one processor, wherein the at least one processor is further caused to:
   control, when determining that the current motion of the electronic device is caused by the human, the distance detecting device to detect whether there is an object in front of the electronic device within the predetermined range; and
   control, when detecting that there is the object in front of the electronic device within the predetermined range, a capturing device to capture an image of scene in front of the electronic device.

3. The electronic device according to claim 1, wherein the at least one processor is further caused to:
   control, when determining that the current motion of the electronic device is caused by the human, a distance detecting device to detect whether there is a human in front of the electronic device within the predetermined range; and
   control, when detecting that there is the human in front of the electronic device within the predetermined range, a capturing device to capture an image of the human in front of the electronic device.

4. The electronic device according to claim 1, wherein the biological characteristics are facial image information or iris characteristics.

5. An unlock method comprising:
   acquiring motion data of an electronic device as detected by a gyroscope at predetermined intervals when the electronic device is locked;
   determining whether current motion of the electronic device is caused by a human, according to the acquired motion data and motion data pre-stored in the storage device;
   controlling a capturing device to capture an image of scene in front of the electronic device when determining that the current motion of the electronic device is caused by the human;
   acquiring the image captured by the capturing device;
   determining whether any biological characteristics in the acquired image match with at least one biological characteristic pre-stored in the storage device; and
   controlling the electronic device to unlock when determining that the biological characteristics in the acquired image match with at least one biological characteristic pre-stored in the storage device.

6. The unlocking method according to claim 5, further comprising:
   controlling a distance detecting device to detect whether there is an object in front of the electronic device within a predetermined range when determining that the current motion of the electronic device is caused by the human; and
   controlling a capturing device to capture an image of the scene in front of the electronic device when detecting that there is the object in front of the electronic device within the predetermined range.

7. The unlocking method according to claim 5, further comprising:
   controlling a distance detecting device to detect whether there is a human in front of the electronic device within a predetermined range when determining that the current motion of the electronic device is caused by the human; and
   controlling a capturing device to capture an image of the human in front of the electronic device when detecting that there is the human in front of the electronic device within the predetermined range.

8. The unlocking method according to claim 5, wherein the biological characteristics are facial image information or iris characteristics.

* * * * *